United States Patent [19]

Cheung et al.

[11] Patent Number: 5,002,349
[45] Date of Patent: Mar. 26, 1991

[54] INTEGRATED ACOUSTO-OPTIC FILTERS AND SWITCHES

[75] Inventors: Kwok-Wai Cheung, Rockaway, N.J.; Brian L. Heffner, Redwood City, Calif.; David A. Smith, Freehold, N.J.

[73] Assignee: Bell Communications Research, Inc., Livingston, N.J.

[21] Appl. No.: 442,848

[22] Filed: Nov. 29, 1989

[51] Int. Cl.$^5$ ................................................. G02B 6/14
[52] U.S. Cl. ................................. 350/96.13; 350/96.14
[58] Field of Search ................ 350/96.11, 96.12, 96.13, 350/96.14, 96.15

[56] References Cited

U.S. PATENT DOCUMENTS

| | | | |
|---|---|---|---|
| 4,273,411 | 6/1981 | Alferness | 350/96.14 |
| 4,384,760 | 5/1983 | Alferness | 350/96.14 |
| 4,390,236 | 6/1983 | Alferness | 350/96.14 |
| 4,533,207 | 8/1985 | Alferness | 350/96.14 |
| 4,645,293 | 2/1987 | Yoshida et al. | 350/96.14 |
| 4,690,500 | 9/1987 | Hayami et al. | 350/96.25 |

FOREIGN PATENT DOCUMENTS

| | | |
|---|---|---|
| 2516663 | 4/1975 | Fed. Rep. of Germany . |
| 2630730 | 1/1977 | Fed. Rep. of Germany . |
| 3247500 | 7/1984 | Fed. Rep. of Germany . |
| 3402131 | 8/1985 | Fed. Rep. of Germany . |
| 3606847 | 3/1986 | Fed. Rep. of Germany . |
| 3744367.4 | 12/1987 | Fed. Rep. of Germany . |

OTHER PUBLICATIONS

H. P. Weber and W. Hodel, "High Power Light-Transmission in Optical Waveguides," SPIE vol. 650, High Power Lasers . . . (1986).
LPX 300 Preliminary Specifications, Lambda Physik, Inc.
Typische Spektrale Dampfungsverteilung der FLUOSIL-Preforms, Feb. 1981, p. 2.
G. Hohberg, "Beam Delivery Systems for High Power Lasers," SPIE, vol. 650, High Power Lasers . . . (1986).
R. M. Klein, "Optical Fiber Waveguides", pp. 286-289.

R. Ringelham et al., Fiber Optics in Medicine, Laser and Optoelektronik 20(4):1988.
Harris et al., "Acousto-Optic Tumnable Filter," Journal of the Optical Society of America, 1969, vol. 59, pp. 744-747.
Ohmachi eta l., "LiNbO$_3$ TE-TM Mode Converter Using Collinear Acoustooptic Interaction," IEEE Journal of Quantum Electronics, 1977, vol. QE-13, pp. 43-46.
Weis et al., "Lithium Niobate: Summary of Physical Properties and Crystal Structures," Applied Physics A, 1985, vol. 37, pp. 191-203.
Boyd et al., Tunable Acoustooptic Reflection Filters in LiNbO$_3$ Without a Doppler Shift, "Journal of Lightwave Technology", 1989, vol. 7, pp. 625-631.
R. W. Dixon, "Acoustic Diffraction of Light in Anisotropic Media," IEEE Journal of Quantum Electronics, 1967, vol. QE-3, pp. 85-93.
Taylor et al., "Electronic Tuning of a Dye Laser Using the Acousto-Optic Filter," Applied Physics Letters, 1971, vol. 19, pp. 269-271.
(List continued on next page.)

Primary Examiner—John D. Lee
Assistant Examiner—Phan T. Heartney
Attorney, Agent, or Firm—James W. Falk; Charles S. Guenzer

[57] ABSTRACT

An acousto-optica converter fabricated on x-cut (LiNbO$_3$ and having an optical waveguide extending along the y-direction. An interdigital transducer is oriented at 5° with respect to the y-direction in order to compensate for the acoustic walk-off on such an orientation. Such as integrated acousto-optical converter allows multiple stages of such converters so as to provide for (1) two-stage zero-frequency shifted converters and filters, (2) lasers using an acousto-optic filter as a tuning element, (3) polarization-independent converters in which the modes are divided, separately polarization converted, and recobined according to frequency, (4) and wavelength division multiplexing routing switches capable of simultaneously switching multiple channels.

24 Claims, 6 Drawing Sheets

Conquin et al., "Electronically Tunable External-Cavity Semiconductor Laser," *Electronics Letters*, 1988, vol. 24, pp. 599–600.

Heffner et al., "Integrated-Opticl Acoustically Tunable Infra-Red Optical Filter," *Electronics Letters*, 1988, vol. 24, pp. 1562–1563.

Heffner et al., "Improved Acoustically-Tunable Optical Filter on X-Cut LiNbO$_3$", *Integrated and Guided-Wave Optics: 1989 Technical Digest Series*, 1989, vol. 4, Conference Edition, pp. 134–137.

"Surface Wave Velocities," *Microwave Acoustics Handbook*, 1973, eds. Slobodnick et al., Air Force Cambridge Research Labs, AD-780, 172, pp. 35,76.

Cheung et al., "Multiple Channel Operation of Integrated Acousto-Optic Tunable Filter," *Electronics Letters*, 1989, vol. 25, pp. 375–376.

Cheung et al., "Simultaneous Five-Wavelength Filtering at 2-2 nm Wavelength Separation Using Integrated-Optic Acousto-Optic Tunable Filter with Subcarrier Detection," *Electronics Letters*, 1989, vol. 25, pp. 636–637.

Smith et al., "Two-Stage Integrated-Optic Acoustically Tunable Optical Filter with Enhanced Sidelobe Suppression," *Electronics Letters*, 1989, vol. 25, pp. 398–399.

Findakly et al., "Single-Mode Integrated-Optical Polarizers in LiNbO$_3$ and Glass Waveguides," *Optics Letters*, 1983, vol. 8, pp. 641–643.

Papuchon et al., "Integrated Optical Polariser on LiNbO$_3$:Ti Channel Waveguides Using Proton Exchange," *Electronics Letters*, 1983, vol. 19, pp. 612–613.

Smith et al., "Integrated-Optic Acoustically Tunable Reflection Filter," *Optics Letters*, 1989, vol. 14, pp. 1240–1242.

Warzanskyj et al., "Polarization-Independent Electro-Optically Tunable Narrow-Band Wavelength Filter," *Applied Physics Letters*, 1988, vol. 53, pp. 13–15.

Cheung et al., "I Gb/s System Peformance of an Integrated-Optic Polarization-Independent Acoustically-Tunable Optical Filter," Post-Deadline Paper: PD-2, 1989, LEOS Annual Meeting in Orlando, Florida.

Alferness et al., "Low-Cross-Talk Waveguide Polarization Multiplexer/Demultiplexer for $\lambda = 1.32$ $\mu$m," *Optics Letters*, 1984, vol. 10, pp. 140–142.

Frangen et al., "Integrated Optical, Acoustically Tunable Wavelength Filter," unpublished, Distributed at the ECIO Conference, Paris, 1989.

Smith et al., "Polarization-Independent Acoustically-Tunable Optical Filter," 15th European Conference on Optical Communication (ECOC '89), 1989, vol. 3, pp. 70–73.

INTEGRATED ACOUSTO-OPTIC FILTERS AND SWITCHES

FIELD OF THE INVENTION

The invention relates generally to acousto-optic devices. In particular, the invention relates to integrated acousto-optic devices and novel applications possible therefrom.

BACKGROUND OF THE INVENTION

Acousto-optic devices have long been known in which a LiNbO$_3$ crystal is electrically driven by an interdigitated electrode structure formed on its surface. The resultant surface crystal vibrations (surface acoustic waves or SAW) interact with light traversing the LiNbO$_3$ crystal. Thereby the light can be electrically controlled by the following method. The LiNbO$_3$ substrate is intentionally birefringent and oriented such that the horizontal (TE) mode and the vertical (TM) mode propagate at different speeds. These polarization states fall in and out of phase over such a short distance, referred to as the beat length, that energy cannot be transferred between them. However, the electrical driven double-comb structure imposes a periodic, alternating stress in the piezo-electric, photo-elastic substrate. If the period of this electrically applied stress is made synchronous with the beat length, energy is efficiently transferred between the TE and TM modes. The interaction depends on the electrical frequency matching the light frequency with physical parameters of the LiNbO$_3$ being included as multiplicative factors. Thereby, the optical frequency can be electrically selected and that selected light component has its polarization converted between the TE and TM modes. By judicious placement of polarizers there results an electrically selectable light filter. Although bulk LiNbO$_3$ has received the majority of attention, similar effects have been reported in bulk TeO$_2$ and CaMoO$_4$. Further, the piezo-electric effect is used to convert the applied voltage to a crystalline stress. Therefore, acousto-optic devices may be fabricated in a birefringent, photo-elastic, but non-piezo-electric substrate if a piezo-electric buffer layer is interposed between the substrate and the electrodes.

Most of the early LiNbO$_3$ acousto-optic devices, such as the tunable acousto-optical filter originally disclosed by S. E. Harris et al. in a technical article entitled "Acousto-optic tunable filter" appearing in Journal of the Optical Society of America, vol. 59, 1969 at pp. 744-747, were bulk devices, relying on both bulk acoustic waves and bulk optical waves. Progress was then made in using surface acoustic waves (SAW) for which the acoustic waves were pinned to the LiNbO$_3$ surface. However, bulk acoustic waves have a very large cross-section (typically with a beam diameter of greater than 1 mm), and to obtain significant acousto-optic interaction without an attempt to guide both the light and the acoustic waves adjacent the surface, acousto-optic devices were heavy power consumers. With these bulk optic devices, usually all other optical and electrical components were external to the LiNbO$_3$ crystal. With the advent of integrated option and opto-electronic integrated circuits, there has arisen a desire to integrate LiNbO$_3$ devices into these circuits and furthermore to reduce the power consumption. That is the light should be guided near the surface and the acoustic waves in the LiNbO$_3$ should be localized. For effective integration with an optical integrated circuit, the acousto-optic device should guide light in a single-mode waveguide. The progress to acousto-optic devices with surface acoustic waves and planar optics has been slow and commercial devices have tended to rely on bulk waves.

An early example of integrated acousto-optic devices was disclosed by Y. Omachi et al. in a technical article entitled "Acousto-optic TE-TM mode conversion using collinear acousto-optic interaction" appearing in IEEE Journal, volume QE-13, 1977 at pp. 43-46. Omachi et al. followed the usual prior art practice of using an y-cut LiNbO$_3$ crystalline substrate. LiNbO$_3$ forms a trigonal crystal at the temperatures at which it is used for acousto-optic devices. R. S. Weis et al. have described in detail the crystal structure of LiNbO$_3$ and its photo-elastic end piezo-electric effects in a technical article entitled "Lithium Niobate: Summary of Physical Properties and Crystal Structure" appearing in Applied Physics A, vol. 37, 1985, at pp. 191-203. They disclose the standard x, y, and z principle axes of LiNbO$_3$. A LiNbO$_3$ crystal having a principle face lying in a plane perpendicular to the x-axis is x-cut LiNbO$_3$.

The advantage of a y-cut LiNbO$_3$ substrate is that the optical and acoustic waves propagate collinearly along the x-direction on its surface with the acoustic power flow being collinear with the acoustic wavefront propagation vector. However, high quality optical waveguide are difficult to fabricate in y-cut LiNbO$_3$ and x-cut LiNbO$_3$ is the subject of a more mature fabrication technology. G. D. Boyd et al. have similarly concluded in a technical article entitled "Tunable Acoustooptic Reflection Filters in LiNbO$_3$ Without a Doppler Shift", appearing in Journal of Lightwave Technology, vol. 7, 1989 at pp. 625-631 that x-cut LiNbO$_3$ is preferred. On the other hand, the x-cut has been avoided because a y-directed acoustic wave on an x-cut walks off and rectilinearly propagates at an appreciable angle from the y-propagating optical wave. Such walk-off limits the acousto-optic interaction length. Boyd et al. proposed solving the 4° walk-off problem by orienting the acoustic transducer at approximately 4°. As will be shown later, this solution is only approximate at small walk-off angles and becomes inadequate at larger walk-off angles.

As described above, one of the primary uses of acousto-optical devices is to provide a tunable optical filter. The transfer function for an acousto-optic filter at a wavelength displacement $\Delta\lambda$ from its peak wavelength $\lambda$ is given by $$I_1(\Delta\lambda) = \left(\frac{\sin(\kappa X)}{X}\right)^2$$

In this equation, $$x = ((1+\phi^2))^{\frac{1}{2}}$$

where $$\phi = \frac{\pi}{\kappa} \cdot \left(\frac{L}{L_{beat}}\right) \cdot \left(\frac{\Delta\lambda}{\lambda}\right)$$

is the detuning parameter for which $$L_{beat} = \frac{\lambda}{\Delta n}$$

is the TE-TM polarization beat length, L is the interaction length and $\Delta n$ is the effective waveguide birefringence. The TE-TM mode coupling coefficient k is given by $$\kappa = \frac{\pi}{2} \cdot \left(\frac{P}{P_0}\right)^{\frac{1}{2}}$$

where P is the acoustic power density and $P_o$ is that acoustic power density required for complete TE-TM mode conversion. It is seen from the above equations that, by making the interaction length L relatively long, the filter can be made very narrow band. In the infrared optical communications band between 1200 nm and 1600 nm, 1 nm FWHM bandwidths have been observed for the central pass band. However, the above equation also show that, regardless of the bandwidth, the relative size of the sidebands remains the same. The first sideband is reduced by only 9 dB from the main pass band.

One of the desired applications of acousto-optic filters in the telecommunications industry is for wavelength-division multiplexing (WDM) fiber optic systems in which different channels at a different wavelengths are transported on a single fiber. The acousto-optic filter or other acousto-optic device then selects one of the channels for filtering or other type of coupling to adjacent media. Such systems have been proposed in commonly assigned U.S. patent applications, Ser. Nos. 07/292,021, filed Dec. 30, 1988 by Cheung P. T. 4,906,064 and 07/324,184, filed Mar. 16, 1989 by Cheung et al.

When acousto-optic devices are applied to more demanding optical applications, an inherent limitation of the prior art single-stage acousto-optic devices arises. The filtering of the optical beam is performed through an acousto-optic interaction that produces a polarization conversion. The mode conversion is achieved by means of a momentum transfer (and associated energy transfer) from the acoustic wave to the optical wave. The energy transfer results in an optical frequency shift $\Delta f$ from the input value $f_o$ equal in magnitude to the acoustic frequency $f_a$. This shift is sometimes referred to as a Doppler shift. The sign of the shift $\Delta f$ depends on the input polarization and whether the directions of light and sound propagation are collinear or contralinear. A typical value of $f_a$ is 350 MHz or $10^{-3}$ nm. This effect is fully explained by Dixon in a technical article entitled "Acoustic Diffraction of Light in Anisotropic Media" appearing in IEEE Journal of Quantum Electronics, volume QE-3, 1967 at pp. 85-93.

The idea of using acousto-optical tunable filters as a tuning element for external cavity lasers has been initiated by Taylor et al. in a technical paper entitled "Electronic tuning of a dye laser using the acousto-optic filter", appearing in Applied Physics Letters, vol. 19, 1971 at pp. 269-271. In that paper, they used an CaMoO4 collinear acousto-optic tunable filter as the tuning element and used it to tune a dye laser at 0.54-0.63 μm. However, the frequency shift of the optical beam during the acousto-optical interaction, as described above, poses a problem. After the optical beam is reflected back from the external cavity into the laser gain medium, the optical frequency of the beam is shifted (either upshift or downshift, depending on the configuration of the filter) by two times the acoustic frequency $f_a$. Such a frequency shift causes undesirable continuous chirping mode changes, and single frequency operation is impossible. The power output is also unsteady because of the chirping nature.

G. A. Coquin et al. have proposed a solution for the frequency shift in a technical article entitled "Electronically tunable external-cavity semiconductor laser" appearing in Electronics Letters, vol. 24, 1988 at pp. 599-600. They proposed cascading within the laser cavity two tunable acousto-optic filters with equal but opposite frequency shifts. However, Coquin et al. used to separate acousto-optic devices so that the system is bulky. More importantly, the separately fabricated acousto-optic converters must be very precisely matched if they are to mode-convert exactly the same ranges of optical wavelengths and the same time produce equal and opposite Doppler shifts.

The above described dependence of frequency shift on input polarization and the general observation that conventional acousto-optic devices rely upon the state of polarization of the optical input point out a further difficulty with acousto-optic devices. They are polarization dependent.

With the widespread deployment of standard non-polarization-preserving single-mode fibers int he rapidly expanding optical communications networks, the requirement of polarization insensitivity in remote and receiver optical processing components becomes necessary. Without such polarization insensitivity, the insertion loss and efficiency of devices so placed become uncontrollably degraded, time dependent and wavelength dependent.

In these optical telecommunication networks, the capacity of fibers can be greatly increased by wavelength division multiplexing. The use of acousto-optic filters has been proposed. However, because of the fixed and relatively large size of the sidebands for acousto-optic filters, the frequencies of the channels must be carefully selected so that neighboring channels fall in the nulls of the transfer function. Further, there has remained the unsolved problem of switching separate channels into and out of a fiber or other optical waveguide already carrying signals at different frequencies. Particularly constraining has been absence of a practical wavelength-selective tap or wavelength-selective routing component capable of switching more than just on single selected channel at a time. The solutions available up to the present have been considered infeasible. If multiple WDM channels are to be simultaneously switched, multiple RF driver frequencies are simultaneously applied to the acousto-optic device. In order to remain within power dissipation limits, such a multiple-channel switcher must be more efficient than that commonly available in the prior art.

SUMMARY OF THE INVENTION

Accordingly, it is an object of the invention to provide an efficient acousto-optical structure on an x-cut piezoelectric substrate.

It is another object of the invention to provide an acousto-optic filter and coupler which do not incur an optical frequency shift.

It is still another object of the invention to provide an acousto-optic filter and coupler which are polarization independent.

The invention can be summarized in one aspect as an integrated acousto-optic polarization converter fabricated on a crystal with non-collinear directions for acoustic phase front and energy propagation. This divergent angle is compensated by launching the acoustic wave at a compensation angle with respect to the optical wave propagation direction, arranged so that the net acousto-optic interaction is effectively collinear.

In another aspect of the invention, a two-stage acousto-optic filter is fabricated as an integrated circuit with an acoustic absorber between the two stages. Thereby, the sidebands are further depressed. If the two-stages are cascaded, the frequency shifts can be made to cancel. The zero-shifted filter can be used as a tuning element for a laser. If the two stages are effected by reflecting the acoustic wave through a single interdigital transducer, the frequency shift is retained but the structure is simplified.

In a still further aspect of the invention, the acousto-optic converter can be made polarization independent by splitting the input into its two polarization modes and performing the acousto-optic, frequency-selective conversion on the two polarizations before recombining the modes on a different waveguide than the unconverted frequencies.

In a yet further aspect of the invention, the acousto-optic converters may be used as a channel switch for wave-division multiplexing telecommunications.

DETAILED DESCRIPTION

Although x-cut LiNbO$_3$ has advantages over y-cut LiNbO$_3$ for fabrication of acoustio-optic devices, it has not been used because acoustic waves launched by a surface acoustic wave (SAW) transducer along the y-axis walk from the y-axis, which is the natural propagation direction for optical waves on an x-cut LiNbO$_3$ surface. The difference in directions is referred to as the walk-off angle, which for x-cut LiNbO$_3$ is 4°. According to a first aspect of the invention, the walk-off problem can be avoided and advantages of the x-cut LiNbO$_3$ can be exploited by orienting the SAW transducer (interdigital electrical structure) at a compensation angle opposite to the walk-off angle with respect to an optical waveguide, which is oriented along the natural optical propagation direction. For x-cut LiNbO$_3$, the compensation angle is 5° such that acoustic waves launched by a SAW transducer oriented at 5° will rectilinearly propagate along the y-axis.

Figure 1:
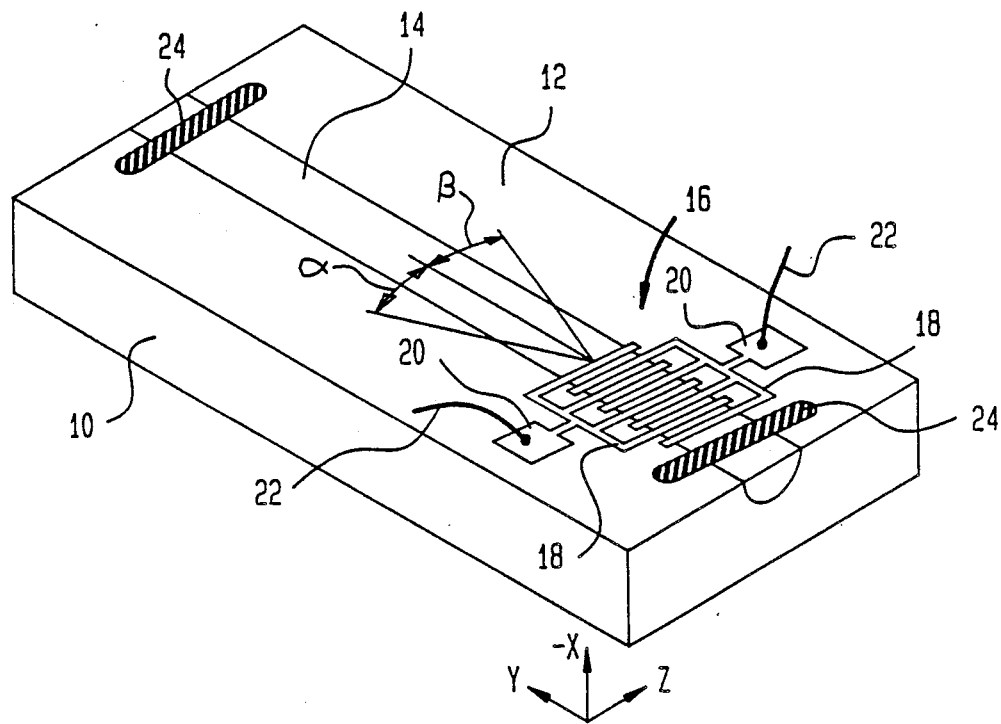
FIG. 1 is a perspective view of an integrated acousto-optic filter fabricated on an x-cut LiNbO$_3$ substrate.

As illustrated in FIG. 1, an LiNbO$_3$ crystal 10 is cut with its principal surface 12 being an x-cut surface. An optical waveguide 14 is then formed on the LiNbO$_3$ surface with its longitudinal axis extending along the y-direction of the LiNbO$_3$ crystal 10.

An example of this aspect of the invention was disclosed by Heffner et al. in a technical article entitled "Integrated-optic acoustically tunable infra-red optical filter" appearing in Electronics Letters, vol. 24, 1988 at pp. 1562–1563 and in another technical article entitled "Improved acoustical-tunable optical filter on x-cut LiNbO$_3$" appearing in "Integrated and guided-wave optics: 1989 technical digest series", vol. 4, conference edition, at pages 134 to 137, both of which publications predate the Boyd et al. publication. In this example, the waveguide 14 was formed by titanium diffusion. Titanium to a thickness of 67.5 nm was deposited on the x-cut surface 12 in an area overlying the waveguide to be formed. The surface titanium was then diffused into the LiNbO$_3$ at 1050° C. for 6.5 hours in a wet, flowing oxygen ambient. Waveguide widths of 7 to 9 μm were found to be satisfactory single-mode guides for the 1.3 to 1.55 μm infra-red light to be guided. The diffusion of the titanium into the LiNbO$_3$ substrate 10 formed the optical waveguide 14. In this invention, only the surface of the LiNbO$_3$ crystal 10 is important so that its thickness is non-critical. In the example, in fact, a 1.0 mm thick LiNbO$_3$ crystal 10 was used.

Following the formation of the optical waveguide 14, an interdigital SAW transducer 16 is fabricated over the waveguide 14 near one of an end of its desired interaction length. In LiNbO$_3$, the walk-off angle $\alpha$ is 4° with respect to the y-direction. That is, if the transducer having straight fingers has those fingers extending perpendicularly to the y-direction (aligned with the y-direction), the acoustic waves launched by the y-aligned transducer would propagate at the walk-off angle $\alpha$. To compensate for the walk-off, the transducer 16 is oriented at a compensation angle $\beta$ in the opposite direction from the walk-off $\alpha$. For LiNbO$_3$, the required compensation angle $\beta$ is 5°. The compensation angle for arbitrary alignment angles on x-cut LiNbO$_3$ can be deduced using the data disclosed in "Microwave Acoustics Handbook", Volume 1A, "Surface Wave Velocities", eds. Slobodnick et al., Air Force Cambridge Research Labs, 1973. This publication is available from N.T.I.S. as publication number AD-780,172. The compensation angle of 5° was derived from the data for LiNbO$_3$ on page 76 using the conventions on page 35 such that the power flow angle is made equal in magnitude as but opposite in sign to the angle of direction of propagation. Precise values may be deduced from numerically interpolating data in accompanying values. As a result of the 5° compensation, an acoustic wave launched by the transducer 16 propagates (power flows) along the y-axis of the LiNbO$_3$ crystal 10 and thus does not walk off from the optical waveguide 14. Data for other materials are available in this reference.

In the example, the SAW transducer 16 was composed of four interdigitated pairs of fingers 18 of overlapping length of 1.7 mm. The finger pairs were arranged on a period of 20 μm with the finger width and the space between fingers 18 both being 5 μm. These parameters were chosen for a transducer bandwidth of 30 MHz and center frequency of 187 MHz. The transducer period would preferably have been increased to 20.7 μm for better transducer efficiency at the 1.523 μm optical wavelength. The 1.7 mm aperture was chosen to match the transducer 16 to a 50 Ω line. The aperture could have been reduced although at the penalty of poorer impedance matching and of acoustic wave diffraction. The SAW transducer 16 in the example was aligned at 5° from the y-direction to within ~1 arc-minute. The acoustic wave was observed to follow the y-direction to within a few arc-minutes. A center frequency of 170 MHZ was experimentally observed. Contact areas 20 were used to wire bond gold wires 22 ultimately connected to an RF generator driving the transducer 16. The fingers 18 and contact areas 20 were composed of gold deposited to a thickness of 150 nm. Inductors of ~50 μH were connected in series with the RF generator in order to create a resonant circuit. The external inductance was then adjusted as appropriate for the capacitance of the transducer 16 to achieve a resonance at 175 MHz, for a Q of ~10. The SAW transducer 16 launches acoustic waves in both directions and these wave are reflected from the ends of the crystal 10. Therefore, acoustic absorbers 24 were affixed to the LiNbO₃ at the rear of the transducer 16 and at the end of desired acousto-optic interaction area. The absorbers 24 may be composed of black wax or rubber cement or even Scotch tape of a few millimeters in cross-section transverse to the waveguide 14 and of lateral extent of about 1 mm. The interaction length L was about 2.5 cm. Nearly complete conversion between the TE and TM modes over the fixed interaction length is achieved by adjusting the applied RF power.

The above acousto-optic tunable converter with a 7 μm waveguide was tested with crossed polarizers externally disposed at opposing ends of the waveguide so as to operate as a filter and was found to have an optical bandpass of 1.3 nm at 1.52 μm. The RF power level was 500 mW, which produced 100 mW of SAW power and 97% conversion efficiency at 1.52 μm. The above described acousto-optic filter could be incorporated into an integrated device by use of integral waveguide polarizers. Polarizer types include proton-exchange polarizers, superstrate (optically contacted), hybrid crystal polarizers and metal-over-dielectric polarizers. It is clearly desirable in this and other acousto-optic integrated circuits to use acoustic waveguides.

The efficiency of the fabricated acousto-optic tunable filter was high enough to utilize a unique feature of an acousto-optic device. The RF frequency on the SAW transducer determines the frequency of the optical passband. If more than one RF frequency is impressed on the SAW transducer, then all corresponding optical frequencies are passed. The acousto-optic device, however, must be efficient enough to allow effective power levels for multiple channels. We have reported such multiple channel operation in two technical articles by K. W. Cheung et al. entitled "Multiple channel operation of an integrated acousto-optic tunable filter" appearing in Electronics Letters, vol. 25, 1989 at pp. 375–376 and "Simultaneous five-wavelength filtering at 2.2 nm wavelengths separation using integrated-optic acousto-optic tunable filter with subcarrier detection" appearing in Electronics Letters, vol. 25, 1989 at pp. 636–637. The acousto-optic tunable filter of the invention is particularly useful as a channel multiplexing device as disclosed.

According to another aspect of the invention, a two-stage acousto-optic filter with a polarizer between the stages may provide better sideband suppression and reduced frequency shift than an equally long single-stage filter. The two-stage transfer function $I_2$ can be generalized from the above equation for $I_1$ as $$I_2(\Delta\lambda) = \left(\frac{\sin(\kappa_1 X_1)}{X_1}\right)^2 \cdot \left(\frac{\sin(\kappa_2 X_2)}{X_2}\right)^2$$

where $x_1$ and $x_2$ are the values of x as defined above for the first and second stages respectively. Identical filters on resonance have $\kappa_1 = \kappa_2 = \pi/2$. In this case, a two-stage filter offers a first sideband intensity of −19 dB relative to the main lobe versus −9 dB for a single stage filter. The transmission on resonance is the same as a single-stage filter.

Figure 2:
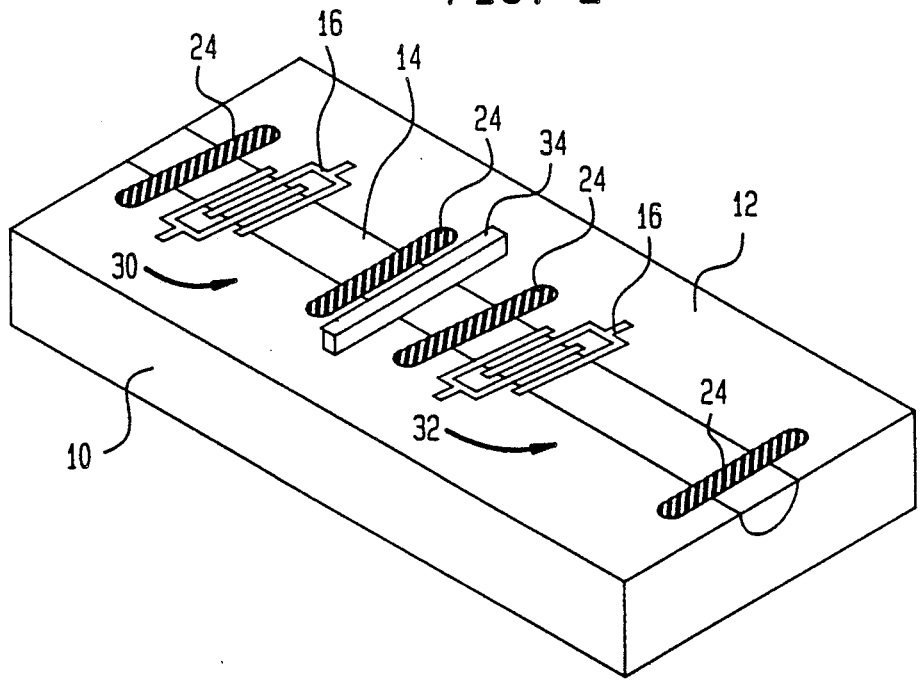
FIG. 2 is a perspective view of a two-stage integrated acousto-optic converter.

Such a two-stage acousto-optic tunable filter can achieved incorporating the two-stage mode-converter illustrated in FIG. 2. The optical waveguide 14 is formed on the x-cut LiNbO₃ substrate 10. A first stage 30 and a second stage 32 of the acousto-optic filter are formed along the same waveguide 14. Four acoustic absorbers 24 acoustically separate the two stages 30 and 32 and also prevent end reflections from the facets of the substrate 10. Two SAW transducers 16 are oriented at the 5° LiNbO₃ compensation angle and excite surface acoustic waves in the respective stages 30 and 32. A common RF source drives both transducers 16. It is, however, noted that separate RF controls provide a potential for optimizing slightly mismatched filters and also offer the potential to introduce a small controllable frequency shift or modulation, if desired.

Assuming that horizontally polarized (TE) light is injected into the waveguide 14 from the left, the first stage 30 converts the polarization of the correct light wavelength substantially to vertically polarized (TM) light. A polarizer 34 with a vertical polarization direction blocks any remaining TE light. At this point, the light has undergone a frequency shift Δf equal to the RF frequency $f_a$. The second stage 32, on the other hand, converts the TM light in the waveguide 14 to TE light and shifts the optical frequency in the reverse direction. An unillustrated output polarizer would be used to block any unconverted TM light. If the two stages 30 and 32 have the same effective index of refraction, the filter center wavelengths will match and there will be appreciable transmission with zero net frequency shift. The polarizer 34 is required between the two stages 30 and 32 for them to act as independent, multiplicative filters, resulting in significant sidelobe suppression as well. The illustration of FIG. 2 assume equal acousto-optic interaction regions of the two stages 30 and 32. These lengths may be made different if the acoustic powers delivered to the respective stages are adjusted so that both stages 30 and 32 provide equal degrees of mode conversion.

The two-stage filter of FIG. 2 is conceptually related to that suggested by Coquin et al. in the above cited article. The present filter has the advantages of compact integration onto a single substrate and the more easily achieved matching of the two stages by such integration. It further offers the potential of the use of only a single SAW transducer.

An example of the second embodiment has been disclosed by D. A. Smith et al. in a technical article entitled "Two-stage integrated-optic acoustically tunable optical filter with enhanced sidelobe suppression", appearing in Electronics Letters, vol. 25, 1989 at pp. 398–399. It was fabricated in a 1 mm thick, 53 mm long x-cut LiNbO$_3$ substrate 10. The optical waveguide 14 was formed by titanium indiffusion along the LiNbO$_3$ y-direction and, in different samples, had widths between 5 and 10 μm. The SAW transducers 16 had five pairs of 200 nm thick evaporated gold fingers arranged on a finger-pair period of 19.5 μm. The interdigitation extended for 1.9 mm. The transducers 16 were aligned at 5° opposite the y-direction from the walk-off angle so as to compensate for walk-off. The acoustic absorbers 24 were 1 mm wide patches of black wax arranged so that the active areas of the two stages 30 and 32 had lengths of 21 mm matched to 0.5 mm. The polarizer 34 was an integral polarizer, specifically a z-cut polished LiNbO$_3$ superstrate optically contacted to the substrate 10 over the waveguide 14 and secured under pressure with a thin caulking of epoxy, following the procedure disclosed by T. Findakly et al. in a technical article entitled "Single-mode integrated-optical polarizers in LiNbO$_3$ and glass waveguides", appearing in Optics Letters, vol. 8, 1983 at pp. 641–643.

In this example, a single RF generator drove both stages 30 and 32. Each stage was tuned by a 30 to 50 μH inductance to a center frequency of 175 Mhz. A HeNe laser was used as the optical source so that $\lambda_o = 1.523$ μm and the RF frequency was swept to determine the transfer functions. Each of the stages was separately measured to have sidebands −8.4 dB relative to the main peak and the main peak had a FWHM bandwidth of about 1.29 nm. However, when both stages were being simultaneously driven, the sidebands were further suppressed to −21.0 dB relative to the main peak while the bandwidth was somewhat reduced to 0.96 nm. Mode conversion efficiencies of 98% were obtained with power of 290 mW and 375 mW directed to the respective stages.

The net zero frequency shift was confined in an optical heterodyne experiment reported in the previously cited technical article entitled "Two-stage integrated-optic acoustically tunable optical filter with enhanced sidelobe suppression", In this experiment, the filtered light was mixed with a diverted portion of the input beam and the beat frequency was detected with a frequency spectrum analyzer.

The second aspect of the invention is not limited to x-cut LiNbO$_3$. For special applications, other cuts and other substrates are possible. Furthermore, the use of acoustic waveguides will lessen the need to orient the launching transducer at the compensation angle. The use of very light weight proton-exchange polarizer in the middle and an acoustic waveguide would make possible the elimination of the two middle acoustic absorbers and the middle acoustic transducer in the filter of FIG. 2. The acoustic wave generated by a single transducer on the end can drive both sections as long as the stages are optically decoupled by a polarizer. Although an acousto-optic tunable filter has been described above, the disclosed device is more generally described as a polarization converter. Applications other than filters, some of which are described later, are possible with the polarization converter of the invention.

The zero-frequency shift acousto-optical filter of FIG. 2 can perform the important function of electrically tuning the optical output frequency of a ring laser. As illustrated in the perspective illustration of FIG. 3, a two-stage acousto-optic filter 40 is similar to that of FIG. 2 with the following differences. A proton-exchange TM polarizer 44 separates the two stages and two proton-exchange TE polarizers 46 are located at opposite ends of the waveguide 14. The methods of fabricating the two types of proton-exchange polarizers are disclosed respectively by Findakly in the above-cited article and by Papuchon in a technical article entitled "Integrated optical polariser on LiNbO$_3$:Ti channel waveguides using proton exchange" appearing in Electronics Letters, vol. 19, 1983 at pp. 612–613. The TM and TE polarizers 44 and 46 may be exchanged in location. Each stage is acoustically driven by one of the SAW transducers 16 oriented at 5°. Acoustic absorbers 24 define the ends of the acousto-optic interaction regions.

Single-mode optical fibers 50 and 52 are pig-tailed to the end facts of the filter 40 with their cores 54 aligned to the optical waveguide 14. The pig-tailing was accomplished by use of UV-curing optical cement which was index matched to eh fiber cores. The other ends of the fibers 50 and 52 are pig-tailed to opposing faces of a lasing medium 56 to form an optical ring including an optical path through the lasing medium 56. Coquin et al. used a semiconductor diode reflection-suppressed laser as the lasing medium 56 for a related Fabry-Perot configuration but other possibilities which provide optical gain in the medium are optical fibers with gain or titanium diffused amplifying waveguides in sapphire.

One ring fiber 52 is coupled by a directional coupler 58 to an output fiber 60. The directional coupler 58 may be a longitudinally extending fusing of the two fibers 52 and 60 and serves to couple a relatively small fraction of the light in the ring fiber 52 to the output fiber 60. The laser cavity extends around to ring defined by the ring fibers 50 and 52, the waveguide 14 and the optical path of the lasing medium 56 a distance of the order 5–10 cm. In such a long cavity, the resonant modes are separated by the order of 100 Mhz or a thousandth of a nanometer, for which mode hopping is not an appreciable effect. Because of the opposed polarizers 44 and 46, there is high loss within the cavity for all frequencies except the frequency or frequencies selected electronically by the SAW transducers 16.

Whatever optical modes are repetitively amplified and filtered have a fraction of their optical energy transferred to the output fiber 60. One end 62 of the output fiber 60 emits clockwise radiation from the ring while another end 64 emits counterclockwise radiation. The filter 40 provides zero-frequency shift so that the laser of FIG. 3 does not suffer from chirping. The optical tuning range of the acousto-optical filter 40 is very wide so that the laser tuning range is probably limited by the gain bandwidth of the lasing medium 56. The acousto-optically tuned laser is unique in that multiple, independently selected frequencies can be caused to simultaneously lase with a suitably inhomogeneously broadened gain medium 56.

The two-stage filter of FIG. 2 has a drawback because it requires careful fabrication in order to match the two stages. The uniformity between stages must be much better than the fractional filter bandwidth $\Delta\lambda/\lambda$ if they are to be driven at a common RF generator, that is, the acoustic frequency $f_a$ is the same in both stages. The proportionality between the acoustic frequency $f_a$ and the optical frequency $f_o$ includes the factor $\Delta n$, which is the temperature-dependent, orientation-dependent, waveguide profile-dependent difference in the effective indices of the TE and TM polarizations. For instance, Δn has been observed to vary as 1 MHz/μm with variations in the waveguide width. This requirement translates into an average width match of at least 0.03 μm between the filter stages. Even in very briefringent LiNbO₃, the device lengths are a few centimeters. Such fine width control over such large distances, although achievable, is difficult.

A fourth embodiment, which is a variant of the second embodiment of FIG. 2, relaxes these precise width requirements for a reduced sideband filter at the cost of a non-zero optical frequency shift. In the embodiment, a single SAW transducer is placed over the optical waveguide. The light beam polarization at the selected frequency is converted as it passes in one direction through the interaction region. The unconverted components are then blocked by a polarizer disposed between the active area and a reflective end. The light beam, after reflection, again passes through the active area but in the opposite direction. Thereby, a single transducer provides two stages of acousto-optic converting. The two stages in a folded configuration are inherently matched, thus relaxing the fabrication requirements. Because of the geometry, the acoustically caused shift in the optical frequency does not cancel but instead is doubled. However, the $\sim 10^{-3}$ nm shift in the optical frequency is negligible for many applications, including optical spectroscopy and some wavelength filtering requirements.

An experimentally verified example of the fourth embodiment has been reported by Smith et al. in a technical article entitled "Integrated-optic acoustically tunable reflection filter" appearing in Optics Letters, vol. 14, 1989 at pp. 1240–1242. In this example, as illustrated in perspective in FIG. 4, an x-cut substrate 66 of LiNbO₃ had two ends 68 and 70 cut at 7° from the perpendicular of the LiNbO₃ y-axis. The 7° value for the facet angle is not critical. The angular faceting is used to prevent optical coupling of unwanted back reflections from the sample. Other methods include anti-reflection coatings and inclining the end face by a small angle with respect to the z-axis. A z-cut substrate 72 had one end 74 cut at the same 7°. An opposing end 76 was cut perpendicularly to the y-axis and coated with gold so as to act as a mirrored endface. The 7° end faces were used to reduce unwanted optical reflections at other than the mirrorered end 76. Two 8 μm wide optical waveguides 78 and 80 were formed along the y-axis in the surfaces of both substrates 66 and 72 by the previously described titanium indiffusion. A SAW transducer 82 was formed over the waveguide 78 near the input/output end 68 of the x-cut substrate 66. The transducer 82 was formed by gold evaporation and had a five finger pairs oriented at the walk-off compensation angle and with a 2 mm aperture. There was a 24 mm interaction length between the acoustic and optical waves in the x-cut substrate 66.

A TM superstrate polarizer 84 was positioned above the waveguide 78 near the input/output end 68 of the x-cut substrate 64. A TE superstrate polarizer 86 was positioned above the waveguide 80 on the z-cut substrate 72. Both polarizers 84 and 86 were formed of LiNbO₃ superstrates. The TM polarizer 84 was z-cut and the TE polarizer 86 was x-cut. As has been disclosed by Findakly et al. in the above described technical article, a z-cut LiNbO₃ crystal bonded over a x-cut LiNbO₃ waveguide acts as a TM polarizer while an x-cut LiNbO₃ crystal bonded over a z-cut LiNbO₃ waveguide acts as a TE polarizer. All the y-axes were aligned. This choice of integral polarizers dictated the use of two LiNbO₃ substrates.

An optical fiber 88 was held by an unillustrated piezo-driven translation stage and butted against the waveguide 78 at the input/output end 68 with an index-matching liquid floating therebetween. This fiber 88 served as both input and output. This example was performed as a demonstration and is considered suboptimum. The structures on the two substrates 66 and 72 were separately fabricated. Only thereafter were the substrates aligned to couple the light between the waveguides 78 and 80 and thereafter bonded together with index-matching cement.

Again, the filter was tested with a 1.523 μm HeNe laser. The single pass transfer function was monitored with the leakage through the gold end mirror 67. The single pass filter has a main peak FWHM bandpass of 1.19 nm and sidebands reduced to −8.7 dB while the folded, double pass filter has a bandpass of 0.88 nm and sidebands reduced to −18.3 dB, in relatively good agreement with theory. An external 3 dB fiber coupler was used to monitor the two-stage filter transfer function. This detection method imposes 6 dB additional loss. These results were achieved with 200 mW of RF power, or about 40 mW of acoustic power.

Figure 4:
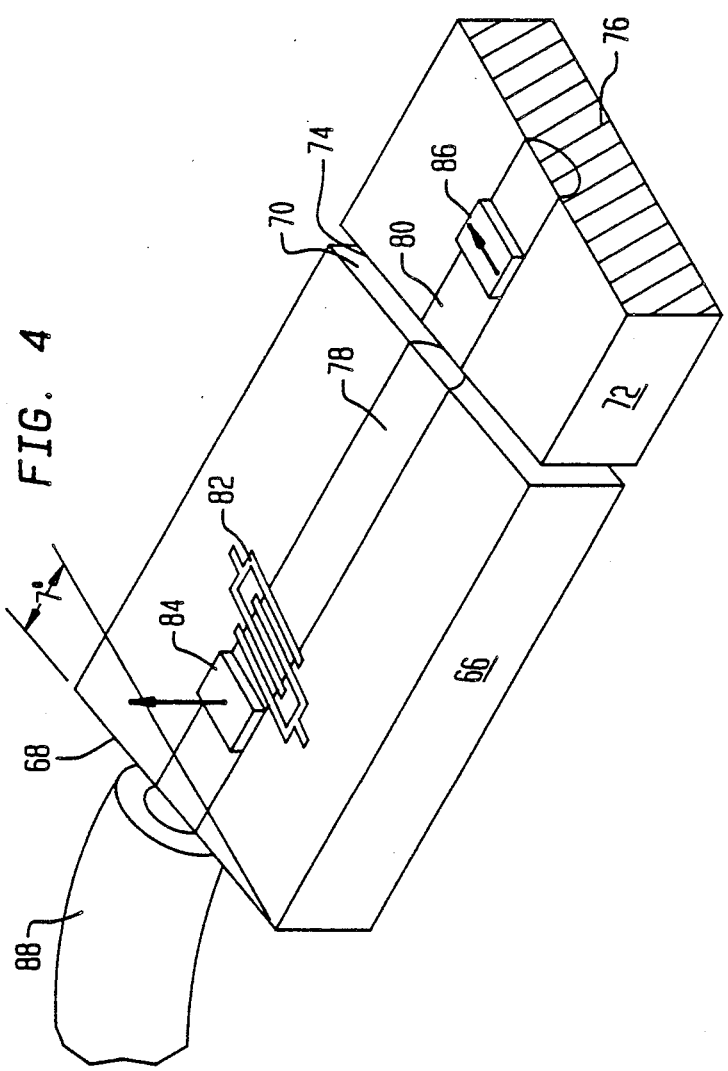
FIG. 4 is a perspective view of a two-stage reflective acousto-optic converter.

The embodiment of FIG. 4 has been demonstrated but other reflective embodiments are expected to be preferred. The use of LiNbO₃ polarizers dictated the use of two substrates, which introduce severe mode mismatching at the interface therebetween. It would be preferred to use a single x-cut LiNbO₃ substrate. Both TE and TM polarizers can be achieved in x-cut LiNbO₃ by the previously described proton-exchange polarizers. If the acoustic beam could be guided to approximately the aperture of the waveguide, the RF power could be drastically reduced. Carefully curved electrodes accounting for the walk-off angle can concentrate the beam along the y-axis. Acoustic waveguiding can be accomplished by an metallic overlayer separated from the titanium optical waveguide by a SiO₂ layer, by mass loading with metal or dielectric layers, by dopant-diffused waveguides, or by etching regions. These methods vary in their effect on acoustic velocity, dispersion and ease of fabrication.

Figure 5:
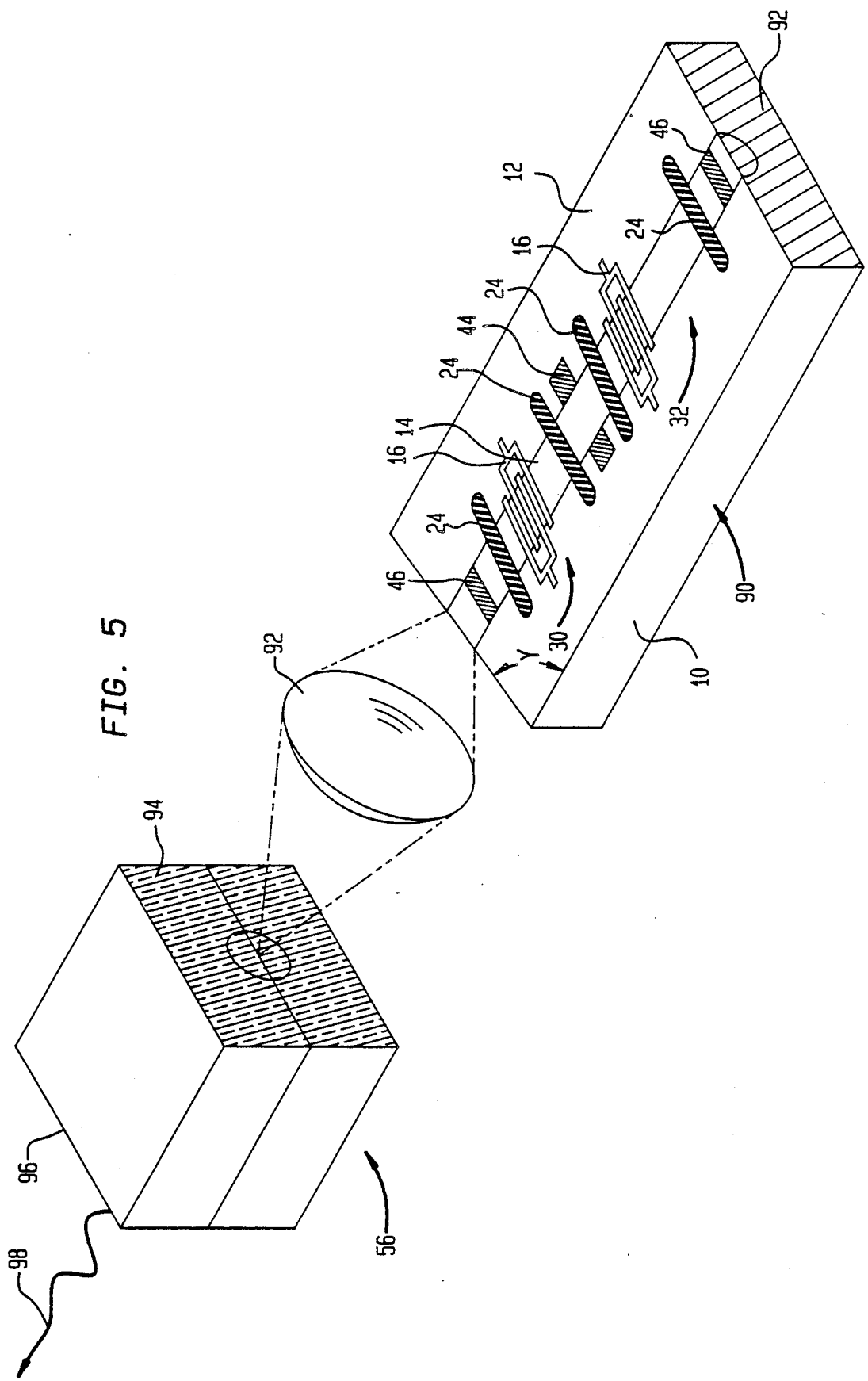
FIG. 5 is a schematic block diagram showing the use of a reflective acousto-optic filter related to that of FIG. 4 in a Fabry-Perot laser.

One end of the two-stage filter of FIG. 2 may be made optically reflective with a polarizer near the reflective end similarly to the embodiment of FIG. 4. The other end is then used for both input and output. Inclusion of the above described three integral polarizers results in a four-stage reflective filter with a zero-frequency change for the optical beam. Such a filter has been proposed in the above article by G. D. Boyd et al. Among other uses, such a frequency invariant, reflective filter can be used as a tuner for a Fabry-Perot laser, as illustrated in FIG. 5.

Figure 3:
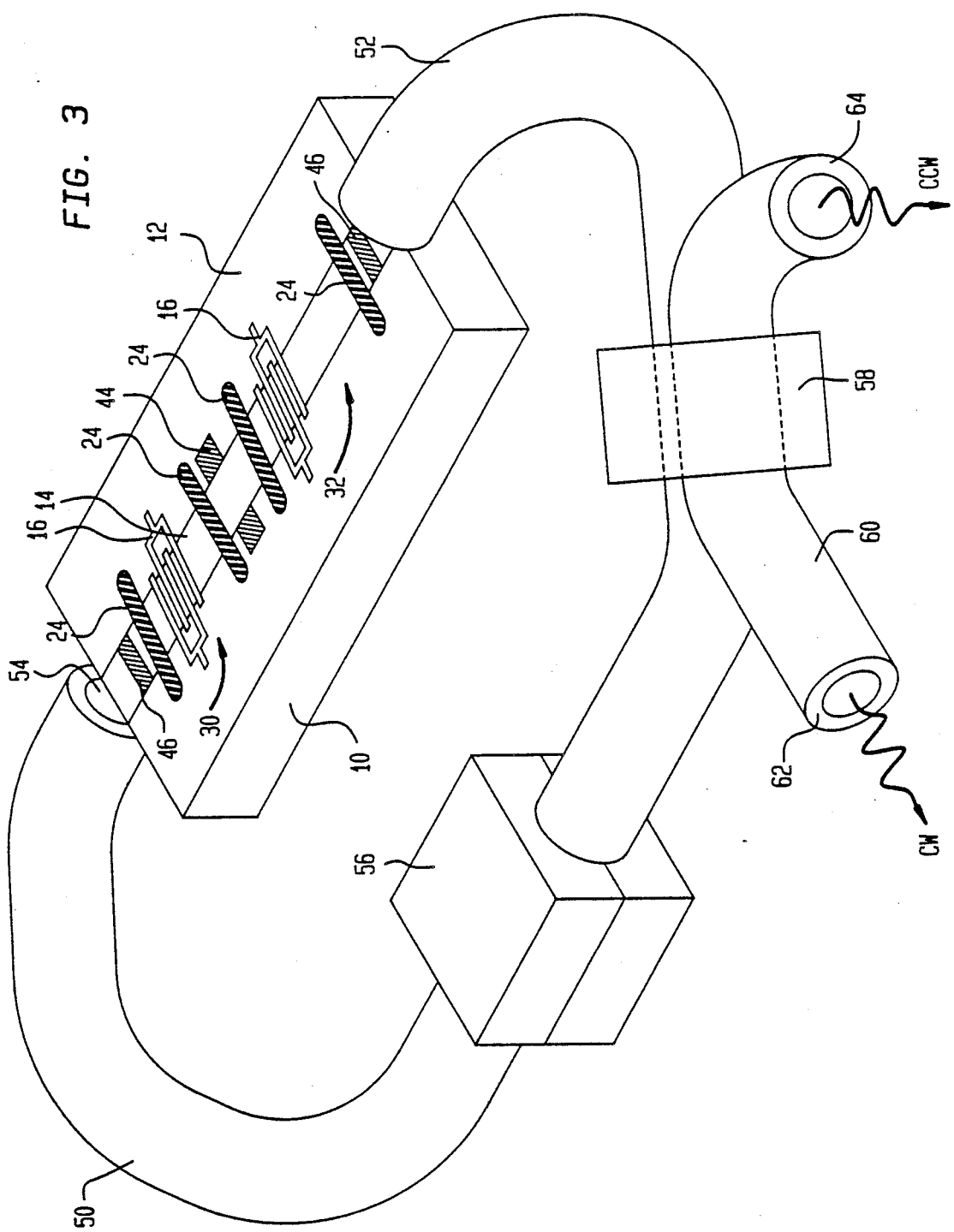
FIG. 3 is a schematic block diagram showing the use of the invention of FIG. 2 in a tunable ring laser.

An acousto-optic filter 90 is similar to the filter 40 in FIG. 3. However, in this specific embodiment, bulk optics rather than optical fibers are used. One end facet is not optically connected to the exterior but instead is coated with a gold mirror 92. The other end facet is not perpendicular to the y-axis along which the waveguide 14 extends but is formed at an angle $\gamma \neq 90°$ with respect to either the x-axis or the y-axis so as to reduce optical reflections. A coupling lens 92 focuses light between the waveguide 14 and the lasing medium 56. The lasing medium 56 has an anti-reflective coating 94 on the side of the light path facing the filter 90 and a partially transmitting and partially reflective coating on an opposing side 96 of the light path. A Fabry-Perot cavity is formed between the reflective end 92 of the filter 90 and the partially transmitting, partially reflective coating of the lasing medium 56. The electrically tunable acousto-optic filter 90 is included within the Fabry-Perot cavity. Thereby, laser light 98 is emitted from the face 96 having the partially transmitting, partially reflective coating. The Fabry-Perot laser of FIG. 5 has many of the same operating characteristics as the ring laser of FIG. 3. The laser suggested by Coquin et al. differs from the laser of FIG. 5 in not using an integrated two-stage acousto-optic filter and reflector.

The use of the efficient x-cut LiNbO$_3$ substrate allows the fabrication of more complex acousto-optic devices within the mature x-cut fabrication technology. For instance, the Fabry-Perot laser of FIG. 5 could be modified so that there is included on the substrate 90 a fractional power coupler, similar to a 3 dB coupler, removing a small fraction of the optical power from the waveguide 14 outside the area of the acousto-optic interaction region. The end 96 of the lasing medium 56 is made fully reflecting. The tapped laser light can be further processed on the substrate 90, e.g., using a Mach-Zehnder modulator to modulate the laser output.

Another important device of some complexity is a polarization-independent acoustically-tunable optical filter. The previously described acousto-optic filters have assumed a state of polarization for their input light. Input polarizers have been used to assure that the input is restricted to this polarization. If the arriving is, in fact, of the perpendicularly opposed polarization, most if not all of the input light is discarded. In telecommunication applications, the optical fibers being used do not maintain polarization and extra light intensity is not available, particularly on the receiving end where acousto-optic filters are likely to find application.

The polarization independent filter of this aspect of the invention separates the TE and TM modes into separate, parallel waveguides, which then pass beneath a common acoustic transducer. In the acousto-optic interaction region, the selected-frequency TE mode in one waveguide is converted to TM mode while the selected-frequency TM mode in the other waveguide is converted to TE mode. All the unconverted modes at the unselected frequencies are then recombined in one optical channel and the converted modes at the selected frequencies are recombined in another separate optical channel.

Figure 6:
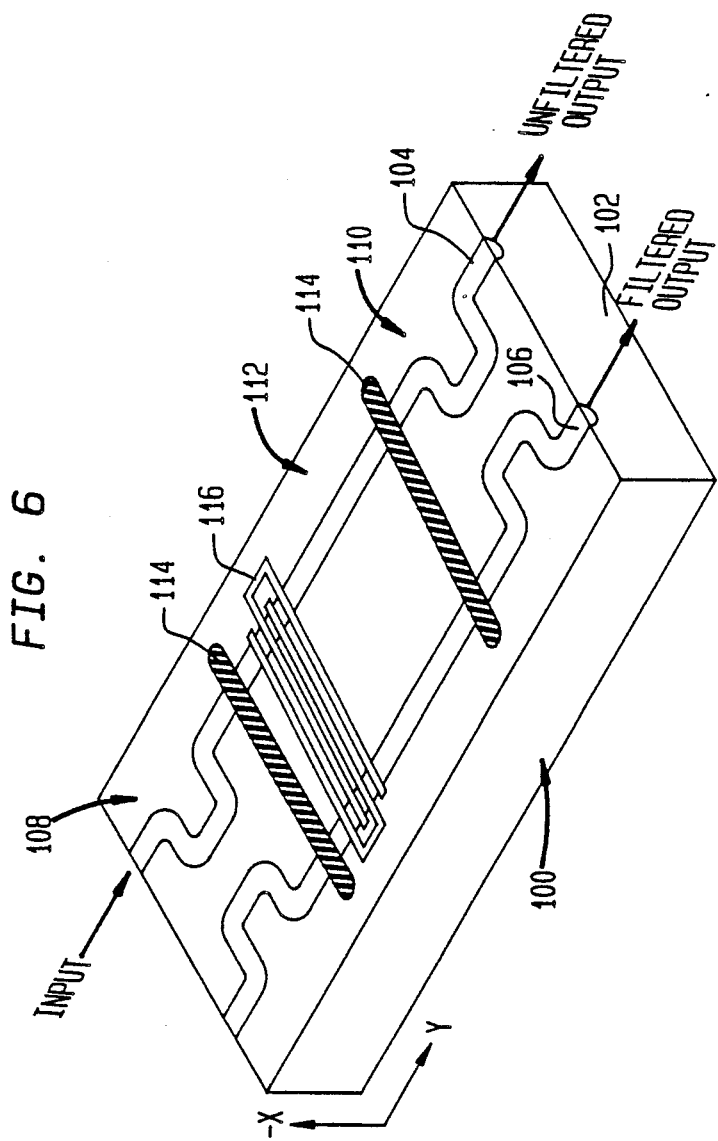
FIG. 6 is a perspective view of a polarization-independent acousto-optic converter of the invention.

An example of a polarization-independent, electrically tunable acousto-optic filter 100 is illustrated in FIG. 6. It was fabricated in a substrate 102 of x-cut LiNbO$_3$ extending for 5 cm along the propagating y-axis. A first waveguide 104 and a second waveguide 106 were formed int he x-cut surface by the indiffusion of 74 nm thick and 8 μm wide titanium stripes. The stripes were arranged such that the two waveguides 104 and 106 were brought close to each other in a first TE-TM splitter region 108 and a second TE-TM splitter region 110. Both these regions were 2.5 mm long, in which the waveguides were separated by 6.5 μm, less than an optical coupling length for the TE modes. Although unillustrated, alternating delta-beta electrodes were used for each splitter region 108 and 110 and were separately tuned for the two regions 108 and 110. Such delta-beta electrodes trim the TE-TM beamsplitting function and have been disclosed by R. C. Alferness et al. in an article entitled "Low-cross-walk-talk waveguide polarization multiplexer/demultiplexer for $\lambda = 1.32$ μm" appearing in Optics Letters, vol. 10, 1984 at pages 140–142. In between the splitter regions 108 and 110, an acousto-optic interaction region 112 was 23 mm long and was bounced by rubber cement acoustic absorber pads 114. Within this interaction region 112, the waveguides 104 and 106 were separated by 27 μm. The bends in the waveguides are exaggerated in FIG. 6 and were bent by an angle of 10 milliradians. Bends of 5 mrad showed much lower loss. The waveguides 104 and 106 were separated on the input and output ends by 27 μm also so as to be decoupled and to be easily separated experimentally. An acoustic transducer 116 was formed over both waveguides 104 and 106 near the absorber 114 on the input side. The transducer 116 was a five-pair evaporated-gold interdigitated electrode with a 9.8 μm pair period and an aperture of 1.9 mm, intended to excite acoustic waves at 175 MHz for an optical wavelength of 1500 nm. It was aligned at the 5° compensation angle. Separate transducers over the two waveguides 104 and 106 are equivalent.

The TE-TM splitter regions 108 and 110 were designed such that a TM mode in one waveguide is completely coupled across the gap to the other waveguide while a TE mode is retained in the same waveguide. Therefore, if unpolarized light is injected into the left side of the first waveguide 104, at the first TE-TM splitter region 108, all TE modes are retained in the first waveguide 104 while all TM modes within the splitter bandwidth are transferred to the second waveguide 106.

The RF power delivered to the transducer 116 was tuned so that one TE-TM conversion occurred over the acousto-optic interaction length 112. This power was 340 mW. In the acoustic-optic interaction region 112, the TE mode in the first waveguide 104 having the selected frequency is converted to the TM mode. All unselected frequencies remain in the TE mode in the first waveguide 104. Similarly, the TM mode in the second waveguide 106 having the same selected frequency is converted to the TE mode. All unselected frequencies remain int he TM mode in the second waveguide 106. The combination of the two splitter regions 108 and 110 separated by the acousto-optic interaction region 112 providing complete mode conversion is referred to as a polarization-diversity configuration.

At the second TE-TM splitter region 110, the selected frequency arrives as a TM mode in the first waveguide 104 and as a TE mode in the second waveguide 106. The second TE-TM splitter region 110 causes the selected TM mode to transfer from the first waveguide 104 to the second waveguide 106, that is, to recombine the selected TE and TM modes on the output end of the second waveguide 106. The filtering is performed independently of the state of polarization (division between the TE and TM modes) in the input light. Similarly, the unselected frequencies arrive as TE modes int he first waveguide 104 and as TM modes in the second waveguide 106. The unselected TM modes are transferred from the second waveguide 106 to the first waveguide 104 and are recombined with the unselected TE modes on the output end of the first waveguide 104.

When the polarization-independent filter of FIG. 6 was tested with RF power of 340 mW at 175 MHz and 1.52 μm optical input, it was found to have an optical bandwith of 1.28 nm. The 3 dB acoustic bandwith was 16 MHz, corresponding to an optical tuning range of 140 nm. The acousto-optic polarization-independent filter of FIG. 6 resembles the electro-optic filter disclosed by W. Warzanskyj et al. in a technical article entitled "Polarization-independent electro-optically tunable narrow-band wavelength filter" appearing in Applied Physics Letters, vol. 53, 1988 at pp. 13–15. J. Frangen et al. have suggested in an unpublished paper entitled "Integrated Optical, Acoustical Tunable Wavelength Filter" distributed at the ECIO Conference, Paris, 1989 that the Warzanskyj design can be applied to building an acousto-optic polarization-independent device.

A potential drawback of the design of FIG. 6 is that the selected mode undergoes a TE to TM conversion in one waveguide and a TM to TE conversion in the other waveguide. In both cases, the acoustic and optical waves are co-propagating. Therefore, the selected mode has its optical frequency Doppler shifted up in one of the waveguides by the acoustic frequency $f_a$ and shifted down in the other. However, this polarization dependance becomes observable only when the optical resolution is better than ∼0.01 nm.

Figure 7:
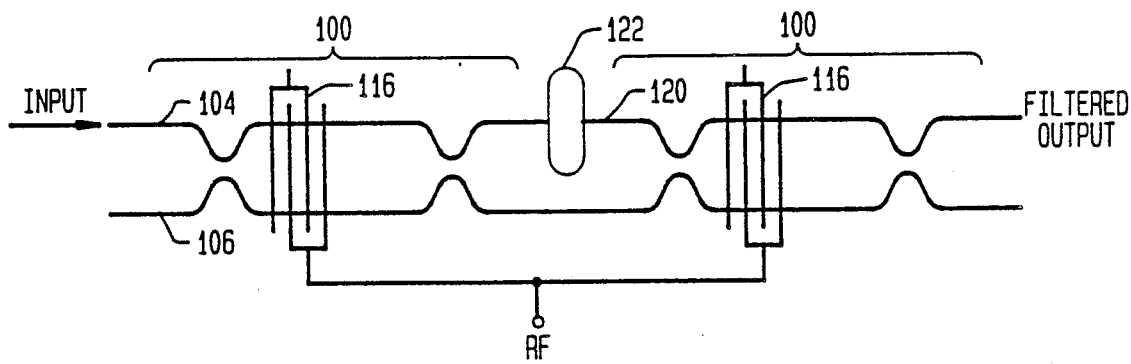
FIG. 7 is a diagrammatic illustration of a zero-frequency shift, polarization-independent converter of the invention.

The polarization-independent filter of FIG. 6 can be made frequency invariant by cascading two of the filters of FIG. 6, as is illustrated diagrammatically in FIG. 7. There are two one-stage polarization independent filters 100 fabricated on the same x-cut LiNbO$_3$ substrate 102. Each stage has a SAW transducer 116, both of which are driven by a common RF generator, that is, at a common RF frequency. The two acoustic absorbers 114 for each stage are not illustrated. The second waveguide 106 is continuous between the stages 100. However, the first waveguide 104 is terminated in an optical absorber 120, such as simply interrupting the waveguide by a break of 1 mm. A third waveguide 120 has a null signal but has a structure corresponding to the first waveguide 104 in the second stage.

In operation, at the end of the first stage the second waveguide 106 contains the selected TE and TM modes although in the polarization state opposite from which they entered the filter. The frequencies of the TE and TM modes furthermore are frequently offset in opposite directions by the acoustic frequency $f_a$. In the second stage, these modes, being reversed in polarization from the first stage, undergo the reverse frequency shift and inverse mode conversion. Thereby, the filtered output provides the selected frequency or frequencies in their original polarizations and with no frequency shifts, to the extent that the two stages are matched.

Although the preceding discussion has primarily been in the context of filters, the polarization-independent converters of FIGS. 6 and 7 can be characterized as wavelength division multiplexing (WDM) switches or routers. The patent application, Ser. No. 07/292,021, cited above discloses such a generic WDM switching system. Referring again to FIG. 6, assume that a first set of WDM channels, including the optical frequency $f_s$, are input on the left side of the first waveguide 104 and that a second set of channels, not including $f_s$, are input on the left side of the second waveguide 106. Assume further that the transducers 116 are excited at an acoustic frequency $f_a$ corresponding to the optical frequency $f_s$ that is desired to be switched. In this situation, the optical output on the right side of the first waveguide 104 will contain all the channels of the first set with the exception of the one at $f_s$. The optical output on the right side of the second waveguide 106 will contain all the channels of the second set plus the channel at $f_s$. Because the transducers can be driven at multiple RF (acoustic) frequencies, multiple channels can be simultaneously switched. Indeed, two channels on separate waveguides can be simultaneously switched to the opposing waveguides.

When the polarization converter of FIG. 6 is used as a router, the combination of the length of the acousto-optic interaction region and the acoustic power delivered to that region are such that one complete polarization mode conversion occurs in the acousto-optic interaction region. The same polarization converter can be used as a tap by reducing the acoustic power level so that only fractional mode conversion occurs. In this case, the unconverted fraction remains on the unfiltered output and the converted fraction is tapped onto the filtered output.

The traffic router of FIG. 6 suffers the disadvantage that the switched channel has had its optical frequency simultaneously shifted up and down in its two polarizations. The frequency shift can be eliminated by using the polarization independent converter of FIG. 7. The first waveguide 104 carrying the channel $f_s$ to be switched, instead of being terminated in the optical absorber 122, carries as an output the first set of channels minus the $f_s$ channel. The second stage performs the frequency correction on the $f_s$ channel. All channels of the second set and the zero-shifted $f_s$ channel are output on the third waveguide 120. This embodiment is disadvantageous in that there is only one useful input port.

Figure 8:
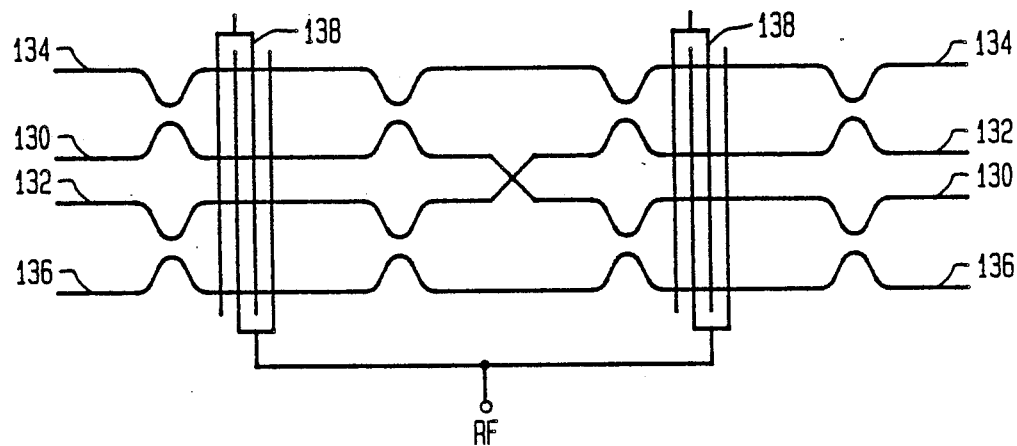
FIG. 8 is a diagrammatic illustration of a zero-frequency shift, polarization channel router of the invention.

A fully reciprocal, polarization-independent, shift-invariant switcher is illustrated diagrammatically in FIG. 8. Two unillustrated optical fibers on the left are assumed to carry respective first and second sets of WDM channels. Four of the polarization converters 100 of FIG. 6 are fabricated on a single LiNbO$_3$ substrate 102 in a 2×2 matrix, cascaded along each of the channel set directions. The optical fibers are optically connected to a first waveguide 130 and a second waveguide 132 respectively. Third and fourth waveguides 134 and 136 have null input signals, at least at the frequency $f_s$ to be switched. Two SAW transducers 138 respectively span all the waveguides 130 through 136 and are driven at a common RF frequency (corresponding to $f_s$) or common set of multiple RF frequencies.

In the first stage of the cascade, the unselected channels on the first waveguide 130 remain thereon while the selected channel $f_s^{(1)}$ is transferred to the third waveguide 134. Similarly the unselected channels on the second waveguide 132 remain thereon while the selected channel $f_s^{(2)}$ is transferred to the fourth waveguide 136. The channels $f_s^{(1)}$ and $f_s^{(2)}$ have the same optical frequency $f_s$ but different informational content. At this stage the selected channels $f_s^{(1)}$ and $f_s^{(2)}$ have their polarization modes reversed and are frequency shifted. The waveguides 130 and 132 then cross over to the other channel set. In the second stage of the cascade, the selected channels have their polarization modes reversed a second time and the frequency shifts are reversed. Also, the selected channels are coupled into the other channel set. Therefore, on the right side, the first waveguide 130 carries the selected channel $f_s^{(2)}$ and all of the first set of channels except $f_s^{(1)}$ and the second waveguide 132 carries the selected channel $f_s^{(1)}$ and all of the second set of channels except $f_s^{(2)}$.

Figure 9:
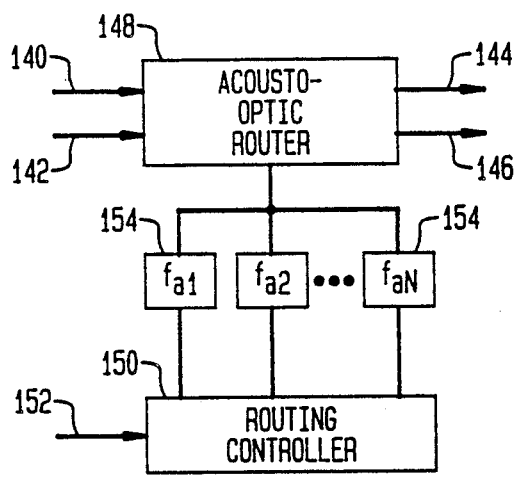
FIG. 9 is a block diagram of a telecommunications switch using the present invention.

A telecommunications switch using the present invention is illustrated in the block diagram of FIG. 9. Two input optical fibers 140 and 142 carry multiple WDM channels of N channels at optical frequencies $f_{01}$, $f_{02}$, ... $f_{0N}$, which may need to be switched to alternate ones of two output optical fibers 144 and 146. It is assumed that in the absence of switching the channels on input fiber 140 are output on output fiber 144 and those on input fiber 142 are output on output fiber 146. The switching is done in an acousto-optic router 148, which may be any of the routers discussed above. The fibers 140 through 146 are optically coupled to the e LiNbO$_3$ waveguides of the router 148. The switching is controlled by a routing controller 150 receiving instructions on a separate control channel 152 for which channels to switch to where. The controller 150 activates any of N RF generators 154 outputting respective electrical signals to the SAW transducer or transducers in the router 148 at RF frequencies $f_{a1}, f_{a2}, \ldots f_{aN}$ in correspondence to the channel optical frequencies. When the controller 150 causes an RF generator 152 to excite the SAW transducer at $f_{ai}$, the channel at $f_{oi}$ is switched from input fiber 140 or 142 to output fiber 146 or 144. More than one channel may be simultaneously switched by activating more than one RF generator 154. Unselected channels remain unswitched. The 2×2 switch of FIG. 9 can be easily generalized to an m×n switch by the use of an array of routers 148.

Although the router of FIG. 8 offers a conceptually simple system design, it is possible that the much simpler router of FIG. 6 would provide adequate performance for the system of FIG. 9 and perhaps produce less noise. Preliminary systems experiments were performed modulating a 1537 nm optical channel with a pseudorandom 990 Mbs data signal. The bit error rate (BER) for this channel was measured as a function of received power both for the channel being selected by the polarization-independent router of FIG. 6 and for the channel not even passing through the router. The use of the router incurred no more than a 0.5 dB penalty over the unrouted channel. These experimental results have been reported in paper PD-2 at the LEOS Conference in Orlando, Fla. in Oct. 1989.

What is claimed is:

1. An acousto-optic polarization converter, comprising:
   a substrate comprising a birefringent, photo-elastic material having an upper surface along a first direction of which an optical wave rectilinearly propagates, a surface acoustic wave being launched in said first direction rectilinearly propagating in a direction offset from said first direction by a walk-off angle;
   an optical waveguide formed in said upper surface and having an optical axis extending along said first direction; and
   transducer means including an interdigital transducer formed over said waveguide and aligned at a compensating angle with respect to said first direction opposite to said walk-off angle, said compensating angle having a value for compensating said walk-off angle such that a surface acoustic wave launched by said transducer means rectilinearly propagates along said first direction.

2. An acousto-optic converter as recited in claim 1, wherein said material comprises LiNbO$_3$, wherein said surface is an x-cut surface of LiNbO$_3$ and wherein said first direction is a y-direction of LiNbO$_3$.

3. An acousto-optic converter as recited in claim 2, wherein said compensating angle is substantially 5°.

4. An acousto-optic converter as recited in claim 1, further comprising acoustic absorbers arranged over said optical waveguide, said transducer being disposed between said acoustic absorbers.

5. The combination as recited in claim 1, comprising at least one said interdigital transducer for producing surface acoustic waves propagating in an acousto-optic interaction region extending along said optical waveguide and further comprising a polarizer disposed in a middle of said acousto-optic interaction region for polarizing light travelling in said optical waveguide.

6. The combination as recited in claim 5, wherein said at least one interdigital transducer comprises two interdigital transducers disposed adjacent said optical waveguide and on opposite sides of said polarizer and further comprising acoustic absorbers disposed adjacent said optical waveguide and between said polarizer and respective ones of said transducers.

7. The combination as recited in claim 1, further comprising:
   an optical reflector formed on said substrate at an end of said optical waveguide for reflecting an optical wave propagating along said waveguide; and
   a polarizer formed on said substrate near said end of said optical waveguide and operatively coupled to said optical waveguide.

8. The combination as recited in claim 1, wherein said optical waveguide is a first optical waveguide extending along said first direction in an acousto-optic interaction region and further comprising a second optical waveguide extending parallel to said first optical waveguide in said acousto-optic interaction region and wherein said transducer is arranged at said compensating angle over both of said first and second optical waveguide, said acousto-optic converter further comprising first and second means disposed respectively adjacent opposite ends of said acousto-optic interaction region for transferring a first of two orthogonal light polarizations from said first optical waveguide to said second optical waveguide.

9. The combination as recited in claim 8, wherein said first and second means each comprises a region in which said first and second optical waveguides extend in parallel separated by an optical coupling distance and wherein said first and second optical waveguides are separated by more than said optical coupling distance within said acousto-optic interaction region.

10. The combination as recited in claim 9, further comprising two acoustic absorbers disposed adjacent both said first and second optical waveguides and between said acousto-optic interaction region and said first and second means respectively.

11. The combination as recited in claim 8,
   wherein a stage comprises said first and second optical waveguides and said first and second means,
   wherein said acousto-optic converter comprises a first and stage and a second said stage and means including said transducer for inducing at least one surface acoustic wave in all of said first and second optical waveguides in said first and second stages,
   wherein said second optical waveguide of said first stage is optically connected to said second optical waveguide of said second stage, and
   wherein said first optical waveguide of said first stage is optically isolated from said first optical waveguide of said second stage.

12. The combination as recited in claim 8,
   wherein a stage comprises said first and second optical waveguides and said first and second means,
   wherein said acousto-optic converter comprises a first said stage, a second said stage, a third said stage and a fourth said stage and means including said transducer for inducing a surface acoustic wave in all of said first and second optical waveguides in said first, second, third and fourth stages, wherein said first optical waveguides in said first and second stages are optically coupled together, wherein said second optical waveguides in said first and fourth stages are optically coupled together, wherein said second optical waveguides in said second and third optical waveguides are optically coupled together, and wherein said first optical waveguides in said third and fourth stages are optically coupled together.

13. An acousto-optic polarization converter, comprising:
a substrate comprising a birefringent photo-elastic material;
light waveguiding means formed in a surface of said substrate;
means for launching at least one acoustic wave into an area of said substrate including said light waveguiding means; and
a first polarizer of a first polarization disposed adjacent said light waveguiding means, said area of said substrate into which said at least one acoustic wave is launched being divided into two parts by said polarizer.

14. The combination as recited in claim 13,
further comprising acoustic absorbers disposed adjacent said optical waveguide between said polarizer and respective ones of said parts;
wherein said launching means comprises two interdigital transducers disposed over said optical waveguide on opposite sides of said polarizer within respective ones of said parts and on a first directional side of said parts and separated from said polarizer by respective ones of said acoustic absorbers.

15. The combination as recited in claim 13, wherein said material comprises LiNbO3, wherein said surface is an x-cut surface of LiNbO3 and wherein said launching means comprises at least one transducer oriented at substantially 5° with respect to a y-direction of LiNbO3.

16. The combination as recited in claim 13, further comprising two polarizers of a second polarization orthogonal to said first polarization disposed adjacent said optical waveguide and separated from said first polarizer by respective ones of said parts.

17. The combination as recited in claim 16, further comprising:
optical guiding means;
optical gain means connected in series with said optical guiding means and with opposite ends of said light waveguiding means to form an optical ring; and
coupling means for coupling out radiation travelling on said optical ring.

18. The combination as recited in claim 16, further comprising:
optical gain means having an optical path therein with a first at least partially reflective end and another end optically coupled to a first end of said light waveguiding means; and
an at least partial reflector formed at a second end of said light waveguiding means, wherein an optical cavity is formed between said first end of said optical gain means and said second end of said light waveguiding means.

19. An acousto-optic converter as recited in claim 13, wherein said parts are of substantially equal length.

20. An acousto-optic converter, comprising a substrate including a birefringent, photo-elastic material having an upper surface, a stage formed in said upper surface, and means for launching a surface acoustic wave along a first direction in an acousto-optic interaction region including a portion of said stage, said stage comprising:
a first optical waveguide, formed partially along said first direction in said acousto-optic interaction region;
a second optical waveguide, formed partially along said first direction in said acousto-optic interaction region; and
first means and second means optically coupling said first and second optical waveguides at respective locations for transferring a first polarization of a radiation from either of said waveguides to the other of said waveguides and not transferring a second polarization of said radiation between said waveguides, said first and second means being separated on said upper surface by said acousto-optic interaction region.

21. An acousto-optic converter as recited in claim 20, wherein said substrate comprises LiNbO3, wherein said upper surface is an x-cut surface, and wherein said launching means comprises an interdigital transducer aligned substantially at 5° with respect to a longitudinal axis of said first and second optical waveguides in said acousto-optic interaction region.

22. An acousto-optic converter as recited in claim 20, comprising a first said stage and a second said stage, both formed in said upper surface;
wherein an output of said first optical waveguide of said first stage is optically coupled to an input of said first optical waveguide of said second stage; and
wherein an output of said second optical waveguide of said first stage is optically isolated from an input of said second optical waveguide of said second stage.

23. An acousto-optic converter as recited in claim 20, comprising a first said stage, a second said stage, a third stage and a fourth said stage, all formed in said upper surface;
wherein an output of said first optical waveguide of said first stage is optically coupled to an input of said first optical waveguide of said second stage;
wherein an output of said second optical waveguide of said first stage is optically coupled to an input of said first optical waveguide of said fourth stage;
wherein an output of said first optical waveguide of said second stage is optically coupled to an input of said second optical waveguide of said second stage; and
wherein an output of said second optical waveguide of said second stage is optically coupled to an input of said second optical waveguide of said fourth stage.

24. The combination as recited in claim 20, wherein an input of said first optical waveguide receives a wavelength division multiplexed signal comprising a plurality of data signals having different respective optical carrier frequencies and further comprising means for impressing a selected number of a plurality of electrical frequencies on said transducer, said selected electrical frequencies being in correspondence to a selected number of said optical carrier frequencies.

* * * * *

UNITED STATES PATENT AND TRADEMARK OFFICE
CERTIFICATE OF CORRECTION

PATENT NO. : 5,002,349

DATED : March 26, 1991

INVENTOR(S) : Kwok-Wai Cheung, Brian L. Heffner, and David A. Smith

It is certified that error appears in the above-identified patent and that said Letters Patent is hereby corrected as shown below:

On the title page:
In the Abstract, line 1, delete "(",
In the Abstract, line 1, "optica" should read --optic--;
In the Abstract, line 6, "as" should read --an--;
In the Abstract, line 12, "recobined" should read --recombined--.
Column 2, line 17, "end" should read --and--;
         line 21, "principle" should read --principal--;
         line 22, "principle" should read --principal--;
         lines 29 and 30, "waveguide" should read --waveguides--.
Column 4, line 14, "to" should read --two--;
         line 27, "int he" should read --in the--;
         line 29, delete "and".
Column 5, line 55, "acoustio" should read --acousto--;
         line 58, "walk from" should read --walk away from--.
Column 7, line 11, "MHZ" should read --MHz--;
         line 57, "cheung" should read --Cheung--.
Column 8, line 52, "assume" should read --assumes--.
Column 9, line 25, "Mhz" should read --MHz--;
         line 38, "confined" should read --confirmed--.
Column 10, line 17, "facts" should read --facets--;
         line 20, "eh" should read --the--;
         line 38, "Mhz" should read --MHz--.
Column 11, line 4, "briefringent" should read --birefringent--.
Column 13, line 30, "arriving is" should read --arriving light is--;
         line 54, "int he" should read --in the--;
         line 67, "cross-walk-talk" should read --cross-talk--.
Column 14, line 40, "int he" should read --in the--;
         line 56, "int he" should read --in the--.
Column 15, line 34, "signal" should read --input signal--;
         line 40, "frequently" should read --frequency--.
Column 16, line 8, "int he" should read --in the--.
Column 17, line 6, "the e" should read --the--.
Column 18, line 30, "waveguide" should read --waveguides--;

UNITED STATES PATENT AND TRADEMARK OFFICE
CERTIFICATE OF CORRECTION

PATENT NO. : 5,001,349

Page 2 of 2

DATED : March 26, 1991

INVENTOR(S) : Kwok-Wai Cheung, Brian L. Heffner, and David A. Smith

It is certified that error appears in the above-identified patent and that said Letters Patent is hereby corrected as shown below:

Column 18, line 53, "first and" should read --first said--.

Signed and Sealed this

Twentieth Day of October, 1992

Attest:

DOUGLAS B. COMER

Attesting Officer

Acting Commissioner of Patents and Trademarks